United States Patent [19]

Thomas

[11] 4,249,079
[45] Feb. 3, 1981

[54] FRONT AND BACK LOADING DUAL CASSETTE SIZE SPOT FILMER

[75] Inventor: Eugene P. Thomas, Baltimore, Md.

[73] Assignee: CGR Medical Corporation, Baltimore, Md.

[21] Appl. No.: 51,502

[22] Filed: Jun. 25, 1979

[51] Int. Cl.³ .............................................. G03B 41/16
[52] U.S. Cl. ..................................... 250/468; 250/471
[58] Field of Search ......................... 250/468, 470, 471

[56] References Cited

U.S. PATENT DOCUMENTS

| 3,173,011 | 3/1965 | Barrett | 250/471 |
| 3,862,426 | 1/1975 | Thomas | 250/471 |

Primary Examiner—Craig E. Church
Attorney, Agent, or Firm—Brady, O'Boyle & Gates

[57] ABSTRACT

A spot filmer for a diagnostic X-ray apparatus can be front or back loaded with two standard sizes of X-ray film cassettes. This versatility is achieved by the provision of a pair of cassette holding half trays or frames and a precision drive including stepper motors enabling the cassette frames to be driven in unison longitudinally and transversely and in opposite directions transversely to adjust for cassette sizes and to achieve firm holding of cassettes during transport and radiography. Mechanical stops are not required in the precision drive. A cassette back edge locator bar is connected by a parallel bar linkage to each cassette half tray or frame and the locator bar is advanced and retracted automatically in response to relative lateral movements of the frames by the precision drive. Compactness, strength and durability and high reliability of the mechanism are attained. The precision drive is compatible with computer controls.

20 Claims, 21 Drawing Figures

FRONT AND BACK LOADING DUAL CASSETTE SIZE SPOT FILMER

BACKGROUND OF THE INVENTION

1. Field of the Invention

The invention relates to a spot filmer for a diagnostic X-ray machine and more particularly to a spot filmer which can be front or back loaded with either a standard 9½ inch square or 14 inch square film cassette. The invention also encompasses a precision drive for a pair of divided cassette half trays or frames and an orthogonal axis guide and transport system for the frames.

2. Description of the Prior Art

Spot filmers for diagnostic X-ray machines are well known including pneumatically driven and electric motor driven types. Most domestic spot filmers are constructed to accept a standard 9½ inch square cassette, and the cassette is generally loaded at the front of the spot filmer, sometimes called "side loading". Older domestic devices employed back loading, sometimes called "top loading", prior to about 1958 when front loading was introduced. Certain new domestic designs have reintroduced back loading in combination with front loading for the operator's convenience, although limited to use of the 9½ inch square cassette.

Film cassettes of various sizes can be accommodated by some European devices, while a few domestic models can handle the 14 inch square standard cassette as well as the 9½ inch square cassette with front loading only. In general, the European devices which can accommodate various cassette sizes employ complex and costly tray size adjustment mechanisms. No domestic or foreign spot film devices are known which allow both front and back loading of 9½ and 14 inch square cassettes. It is the main objective of the invention to provide such a spot filmer of increased utility and convenience of use, and to also provide a simple and reliable precision drive system for the spot filmer embodying the invention which is economically practical, sturdy and durable.

SUMMARY OF THE INVENTION

The invention is embodied in a front and back loading dual cassette size spot filmer which includes a pair of opposing cassette holding transport frames which are shiftable longitudinally in unison from a center parked position to an advanced radiography position and are also shiftable transversely in unison to achieve the necessary positioning of the X-ray film in the smaller size cassette at the radiography station to expose portions, such as quadrants thereof, to the X-rays. The cassette frames are also movable transversely in opposite directions to adjust for the two cassette sizes and to exert a gripping force on the cassettes at the radiography station and during transport, the two frames holding the cassettes without pressure during loading and unloading. A longitudinal and transverse axis guidance and transport system for the two cassette frames is powered by a precision drive which assures accuracy in the movement and positioning of the two frames and the cassette at all times in the operating cycle. Computerized controls for the drive can be utilized.

DETAILED DESCRIPTION

Referring to the drawings in detail wherein like numerals designate like parts, the numeral 25 designates a spot filmer for a diagnostic X-ray apparatus having the usual tower, not shown, for the support of the spot filmer rising from one side of the table of the apparatus. The spot filmer 25 is illustrated in the drawings in a level position as where the table of the diagnostic X-ray apparatus is level. The spot filmer includes a rectangular comparatively shallow housing 26 for the components of the invention, to be described, the housing being connected to the tower, not shown, in a conventional manner.

Figure 1:
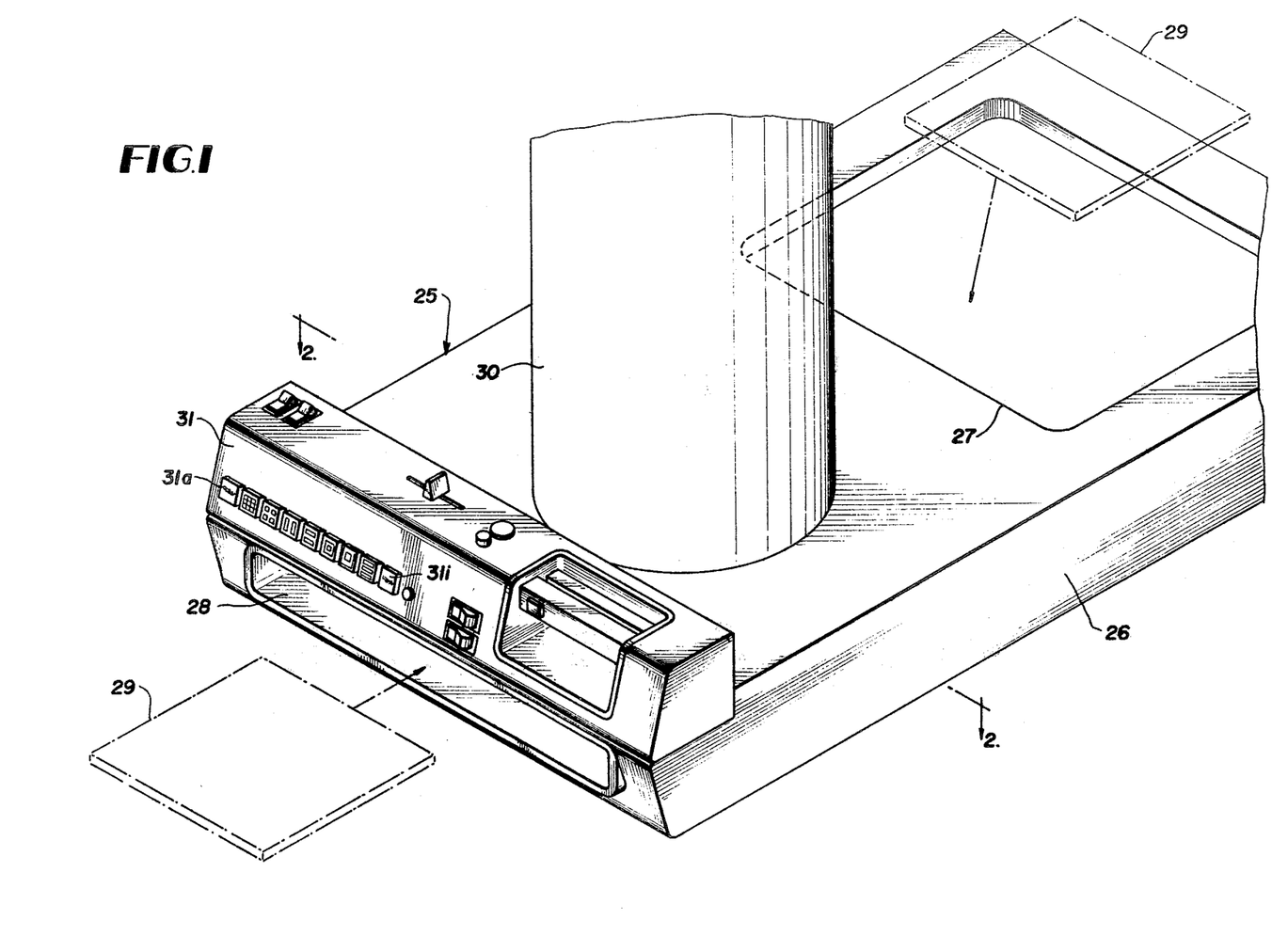
FIG. 1 is a fragmentary perspective view of a front and back loading dual cassette size spot filmer according to the invention.

The spot filmer 25 is of the front and back loading type and capable of handling either 9½ inch square film cassettes or 14 inch square cassettes selectively. In FIG. 1, there is shown a back loading opening 27 in the top wall of housing 26 large enough to receive the 14 inch cassette with adequate clearance and a front loading horizontal slot 28 for the purpose of receiving either the larger or smaller size cassette. For the purpose of illustration in FIG. 1, the 9½ inch film cassette is indicated at 29 in phantom lines with directional arrows at the front and back loading positions. An image intensifier 30 and associated equipment rises from the housing 26 of the spot filmer between the front and back loading stations. A push button control panel 31 is located at the front of the spot filmer having several control push buttons 31a through 31i whose use will be described subsequently herein. These push buttons are a part of a computerized control system, not shown, for the spot filmer, such as a microprocessor control system with which the invention is fully compatible. Another suitable type of control system for the invention is disclosed in U.S. Pat. No. 3,862,426, issued Jan. 21, 1975.

The components of the spot filmer forming the invention are located in the housing 26. These components are shown schematically in FIG. 17 and are shown in greater constructional detail in the other drawing figures. More particularly, the spot filmer 25 comprises a pair of laterally opposed cooperative half trays 32 or frames adapted to hold a film cassette of either of the two sizes previously identified. Each frame 32 comprises a bottom longitudinal cassette support ledge 33 having front and back short transverse extensions 34 and 35 projecting inwardly in a common plane with the ledge 33. The remaining area between the bottom ledges of the frames 32 is open, as illustrated. Each frame 32 additionally comprises a longitudinal side wall 36 rising from the ledge 33 at right angles thereto and a back wall 37 of the same height as side wall 36 and disposed at right angles to the bottom ledge 33 and side wall 36. Short upstanding cassette positioning lips 38 whose heights approximate the thickness of a cassette rise from the front ledge extensions 34. The cassette holding structure embodied in the two frames 32 is entirely open at the top and also at the front between the interior ends of the elements 34 and 38. When a cassette is front loaded or back loaded through the slot 28 or opening 27, FIG. 1, it will come to rest on the ledges 33 and their extensions 34 and 35 and will be confined laterally between the side walls 36 and longitudinally of the spot filmer between the back walls 37 and front lips 38.

The heart of the invention utilized with the cassette holding frames 32 resides in a longitudinal and transverse axis guidance system for the two frames and a precision drive to move the frames and the cassette being held by them longitudinally and transversely at proper times.

A pair of parallel longitudinally extending guide rods 39 for the two frames 32 consists in each case of an exterior non-rotatable cylindrical tube 40 containing within it in coaxial relationship a rotary through shaft 41 for the lateral propulsion of the frames 32 in unison in a common direction as when positioning a cassette and its contained film for exposure to X-rays in a certain quadrant of the film, and in opposite directions to produce lateral clamping of a cassette during transport and at the filming station or the loose holding of the cassette at loading and unloading stations.

The rotary shafts 41 carry drive gears 42 at their forward and rear ends which roll transversely on toothed rack bars 43 near the front and back of housing 26. The two rack bars 43 are parallel transversely of the housing and are fixedly mounted on sturdy supporting brackets 44, FIG. 15, attached to the bottom of the housing.

Figures 14, 15, 16, 17:
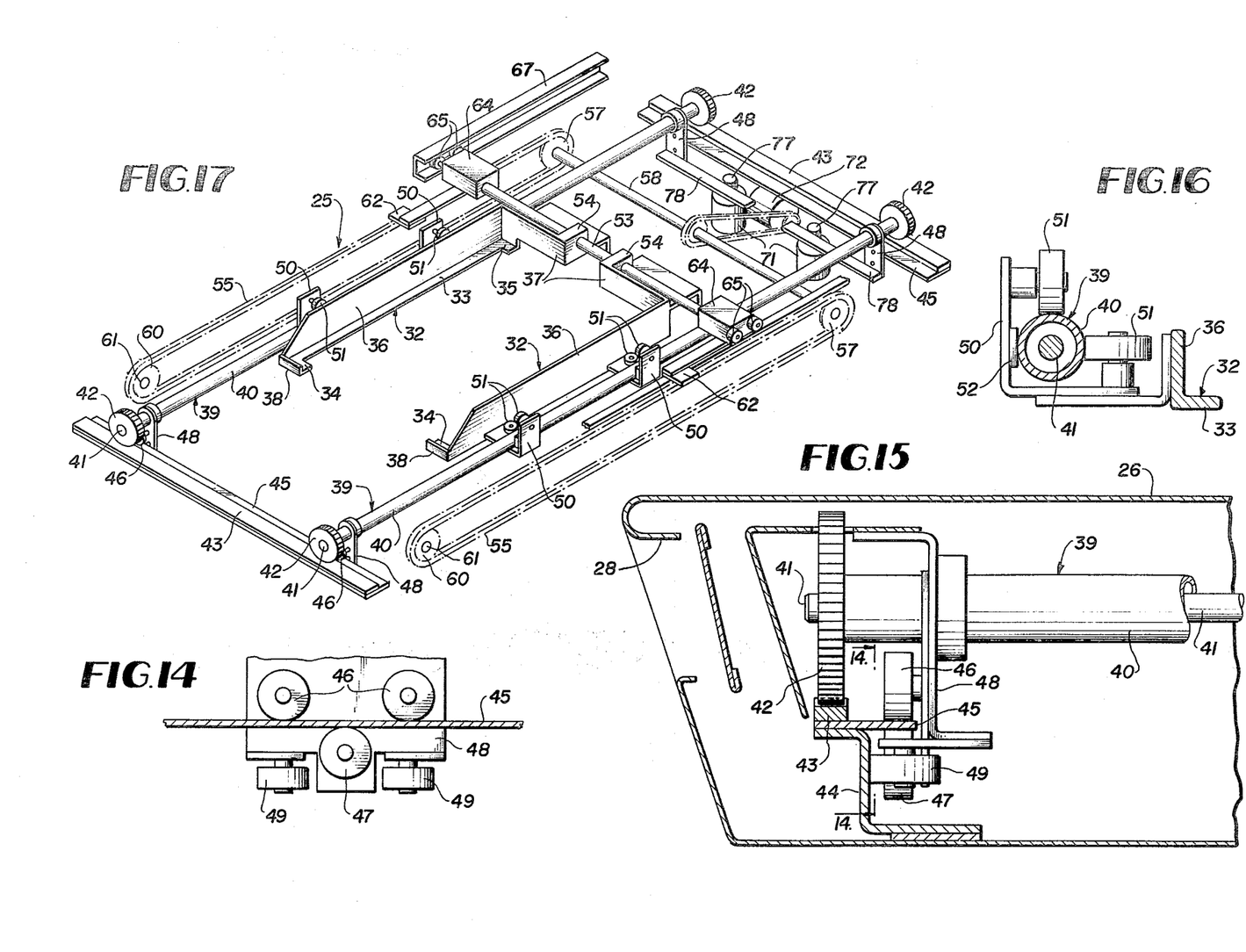
FIG. 14 is a fragmentary vertical section taken on line 14—14 of FIG. 15.
FIG. 15 is an enlarged fragmentary vertical section taken on line 15—15 of FIG. 2.
FIG. 16 is a fragmentary vertical section taken on line 16—16 of FIG. 2.
FIG. 17 is a partly schematic perspective view of the spot filmer including its precision drive and guidance system.

For precise guidance of the shafts 41 and their outer tubes 40 during transverse movement, a flat transverse guide plate or track 45 immediately beneath each rack bar 43 is engaged at its top and bottom faces by guide rollers 46 and 47, FIGS. 14 and 15, secured to a carriage 48, in turn connected to and moving with each guide rod assembly 39 independently. The carriages 48 also mount at their bottoms additional guide rollers 49 in planes perpendicular to the rollers 46 and 47 and having guided engagement with support brackets 44.

The two cassette holding frames 32 are each connected to the guide rods 39 at their outer sides through longitudinally spaced bearings 50, FIG. 16, each containing a pair of right angular guide rollers 51 engaging the top and the inner side of one guide rod 39 and an additional bearing surface element 52 at the outer side of each guide rod. These bearing rollers assure positive and precise guidance of the cassette holding frames 32 longitudinally of the spot filmer along the guide rods 39. The same bearing arrangement also provides firm support for the frames 32 on the guide rods 39 so that the latter, when displaced transversely by the action of the gears 42 and rotary shafts 41, will carry the frames 32 along without play or lost motion.

Figure 2:
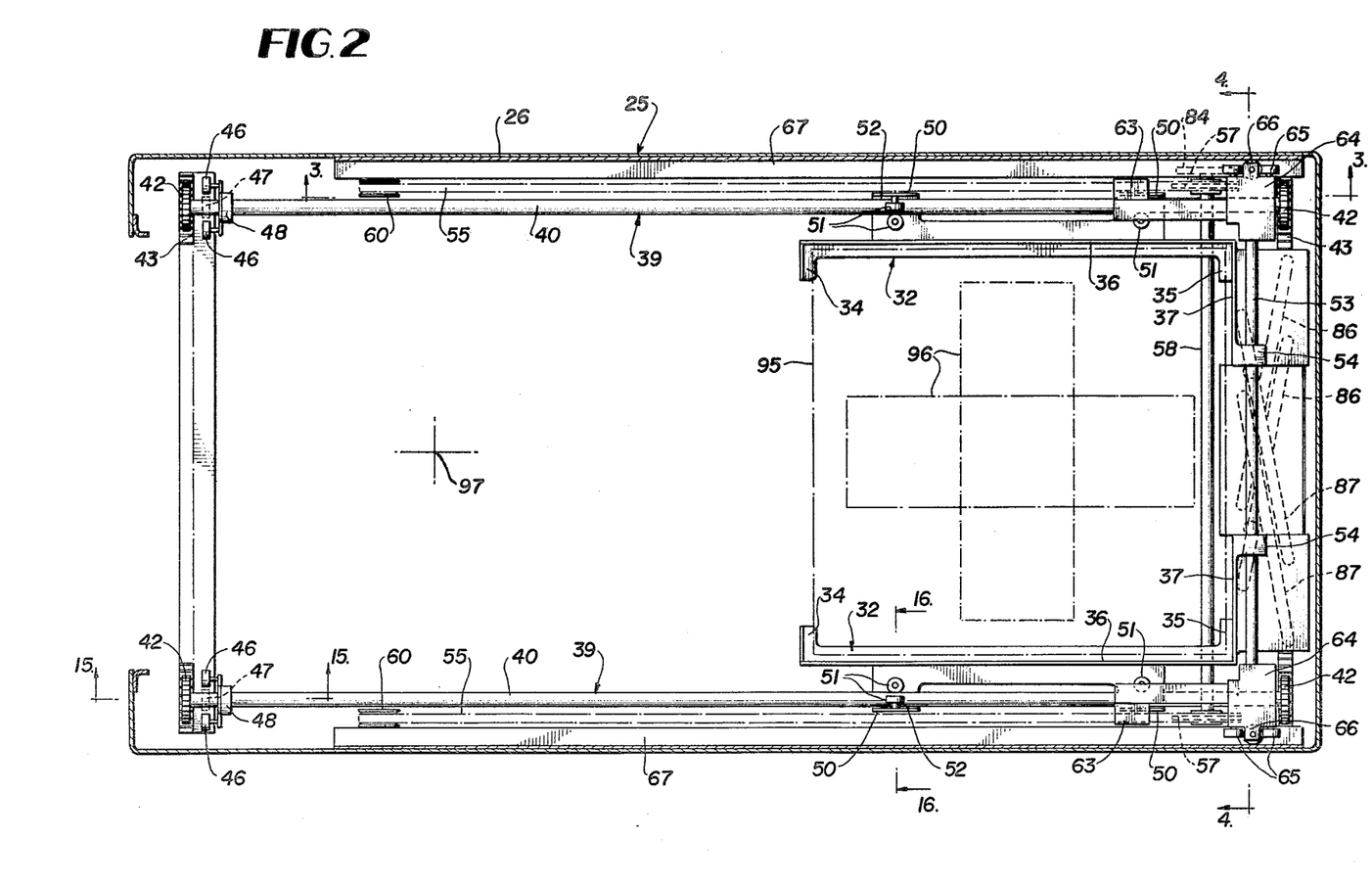
FIG. 2 is a horizontal section taken through the spot filmer taken on line 2—2 of FIG. 1.

Displacement of the frames 32 and cassette along the guide rods 39 is effected by the forward or rear movement of a transversely extending drive bar 53 disposed at right angles to the axes of the longitudinal guide rods 39, FIGS. 2 and 17. The backs of the two frames 32 carry transversely spaced bearings 54 which are slidably engaged with the transverse drive bar 53 so that the frames 32 are positively guided in their lateral movements as well as longitudinally. The drive bar 53, through additional means to be described, also serves to propel the frames 32 longitudinally.

The longitudinal drive means for the frames 32 and drive bar 53 comprises synchronized parallel longitudinal drive chains 55 near and inwardly of the side walls of housing 56 and between such side walls and the guide rods 39. The chains 55 are driven by rear sprockets 57 mounted on a transverse drive shaft 58 journaled in bearings 59, FIG. 4, on the side walls of housing 26. The forward ends of chains 55 are connected with idler sprockets 60 supported by stub shafts 61 suitably attached to the housing.

The synchronized chains 55 are attached as at 62 to bracket elements 63 depending from carriage plates 64 equipped at their outer ends with guide rollers 65 and 66 having guided engagement with longitudinal channel tracks 67 mounted on the side walls of housing 26. The carriage plates 64, FIG. 4, carry depending drive blocks 68 having openings receiving the opposite end portions 69 of transverse drive bar 53. It will be readily understood that movement of the longitudinal chains 55 displaces carriage plates 64 longitudinally and in turn the carriage plates cause movement of the drive bar 53, frames 32 and cassette along the longitudinal guide rods 39. The transverse axis bearings 54 at the backs of frames 32 are located on the frames to support any torque around the guide rod axis and to allow transverse movement of the two frames without binding.

Figures 3, 4:
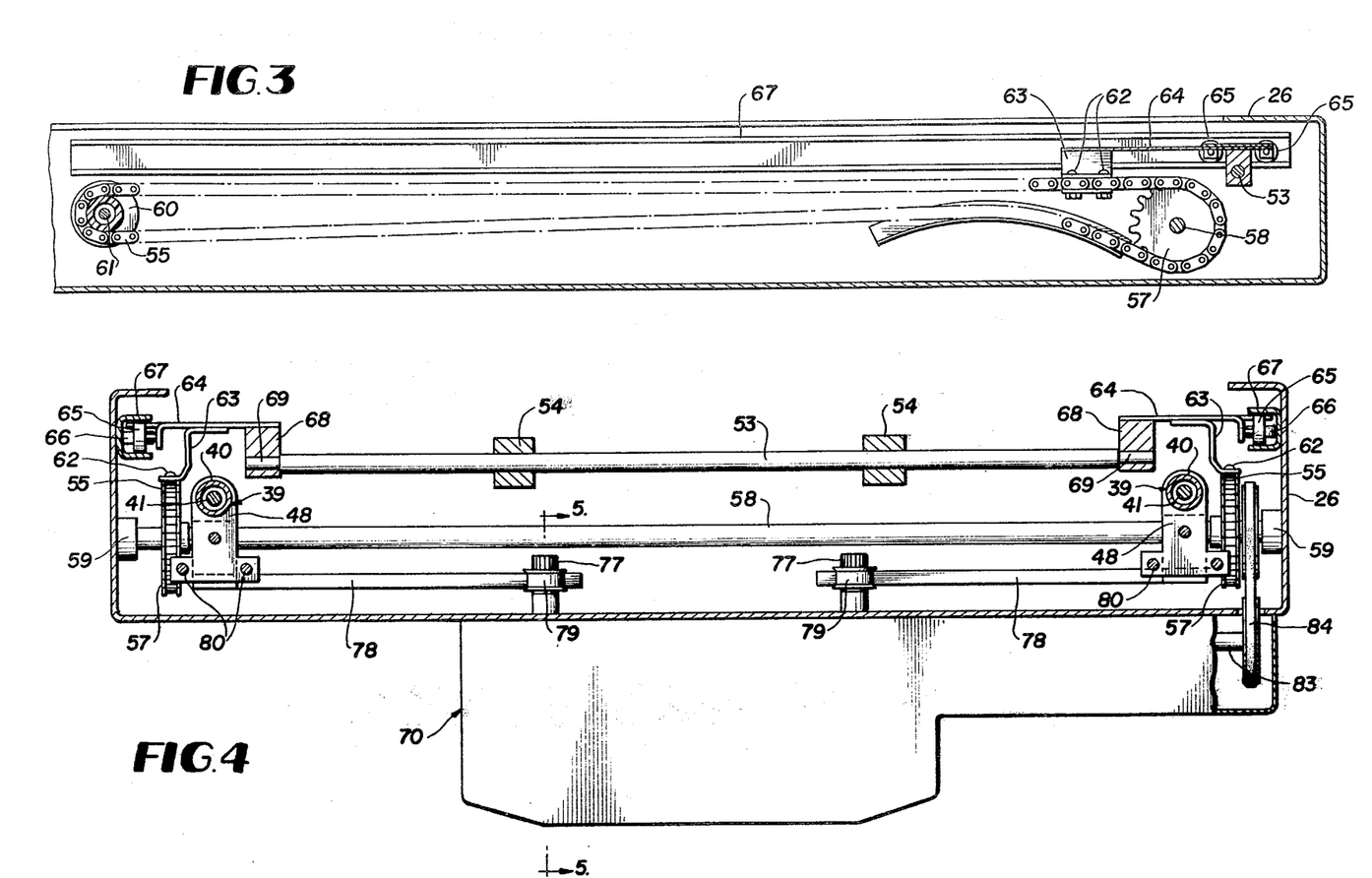
FIG. 3 is a longitudinal vertical section taken on line 3—3 of FIG. 2.
FIG. 4 is a transverse vertical section taken on line 4—4 of FIG. 2.
Figure 5:
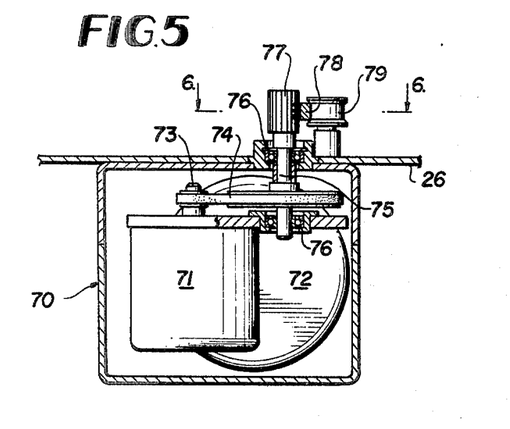
FIG. 5 is a fragmentary vertical section taken on line 5—5 of FIG. 4.
Figure 6:
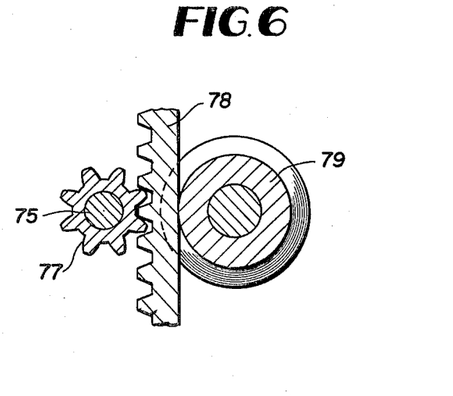
FIG. 6 is an enlarged fragmentary horizontal section taken on line 6—6 of FIG. 5.
Figure 7:
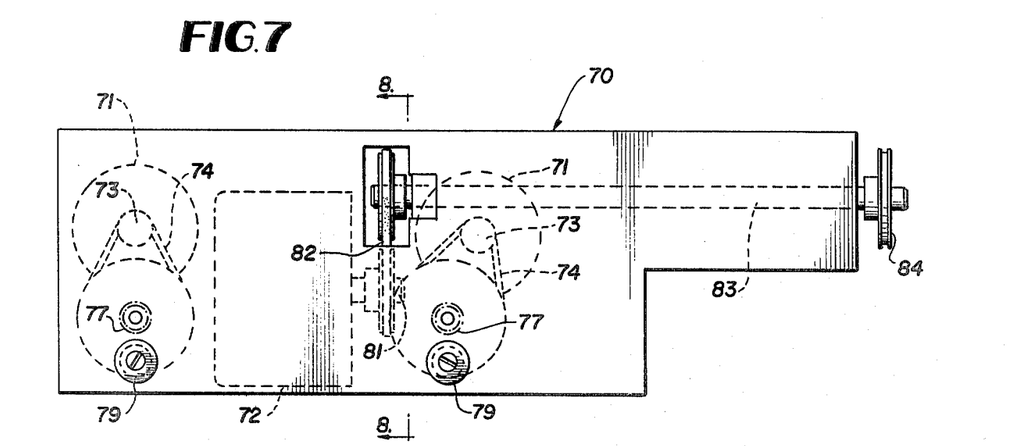
FIG. 7 is a plan view of a stepper motor assembly.
Figure 8:
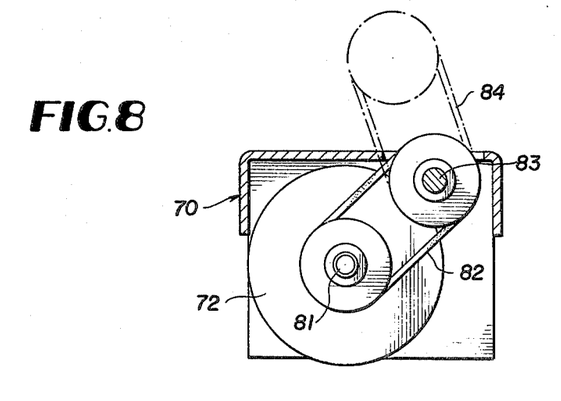
FIG. 8 is a vertical section taken on line 8—8 of FIG. 7.

The precision drive for the spot filmer comprises a stepper motor module 70 at the back of housing 26 and depending therefrom, FIGS. 4 and 5. The module 70 contains two vertical axis laterally spaced stepper motors 71 for the synchronized transverse driving of the two frames 32 in the same direction or oppositely, and a single transverse axis stepper motor 72 between the two motors 71 for the longitudinal driving of the frames 32 through chains 55 along the guide rods 39.

Each stepper motor 71, FIG. 5, has its output shaft 73 connected through suitable gearing 74 with an upright axis pinion shaft 75 journaled in ball bearings 76. A drive pinion 77 on each shaft 75 meshes with a transversely shiftable rack bar 78 backed up on its rear side by a fixed axis stabilizing and guide roller 79. Each shiftable rack bar 78 has its outer end portion fixed as at 80, FIG. 4, to the adjacent carriage 48 of one of the longitudinal guide rods 39. It can thus be seen that displacement of the rack bars 78 transversely by the stepper motors 71 will correspondingly move the guide rods 39 of the two frames 32 laterally either in a common direction or oppositely, as required in the cycle of operation of the spot filmer.

The stepper motor 72 for powering the chains 55 has its output shaft 81 coupled through gearing 82 with a transverse countershaft 83 of the module 70. This countershaft in turn is connected through additional gearing 84 with one end of the transverse drive shaft 58 which powers the two chains 55 in synchronism.

Figure 9:
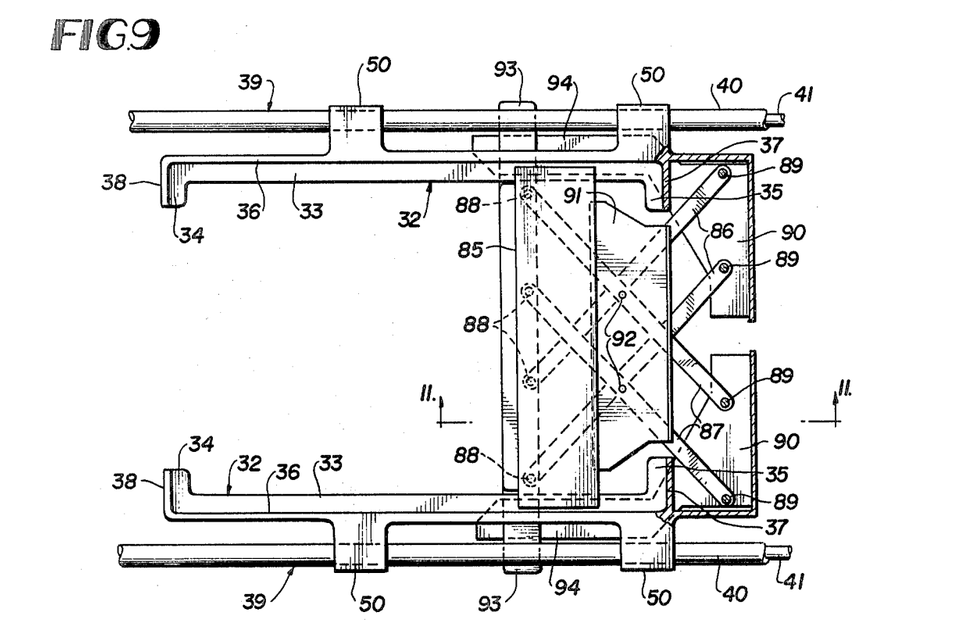
FIG. 9 is a fragmentary plan view, partly in section, showing a cassette rear edge positioning bar, control linkage and associated parts adjusted for a 9½ inch square cassette.
Figure 10:
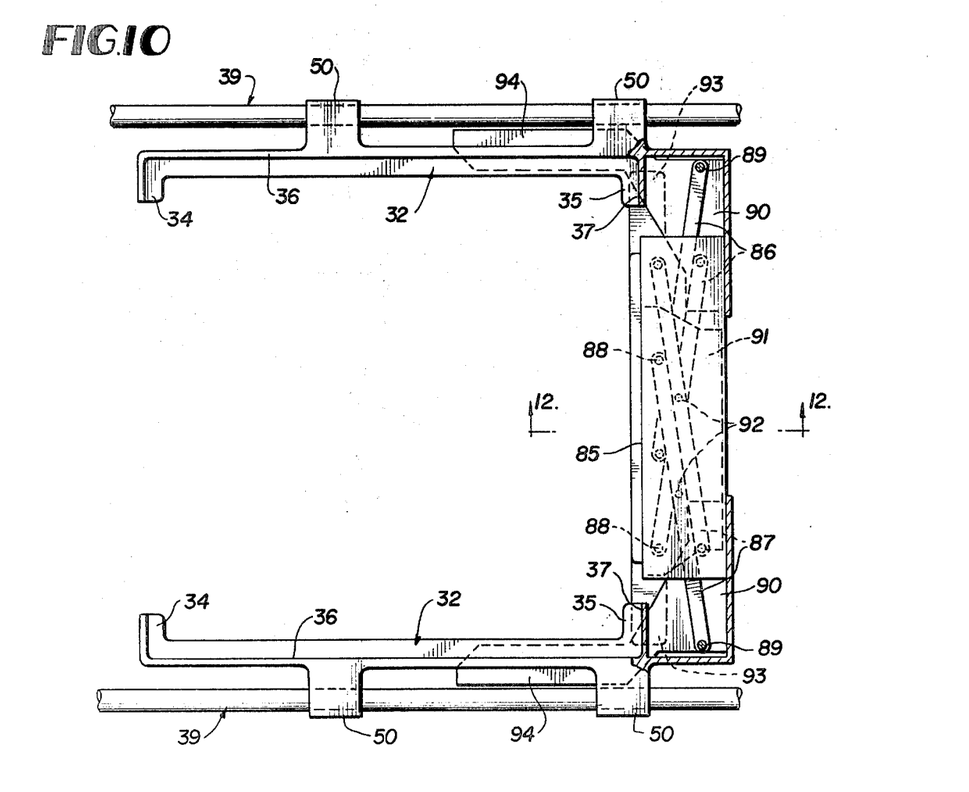
FIG. 10 is a similar view of the same elements adjusted for a 14 inch square cassette.
Figure 11:
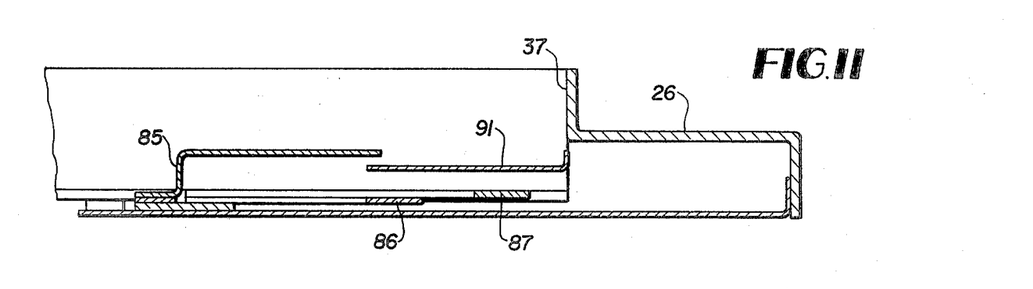
FIG. 11 is a fragmentary vertical section taken on line 11—11 of FIG. 9.
Figure 12:
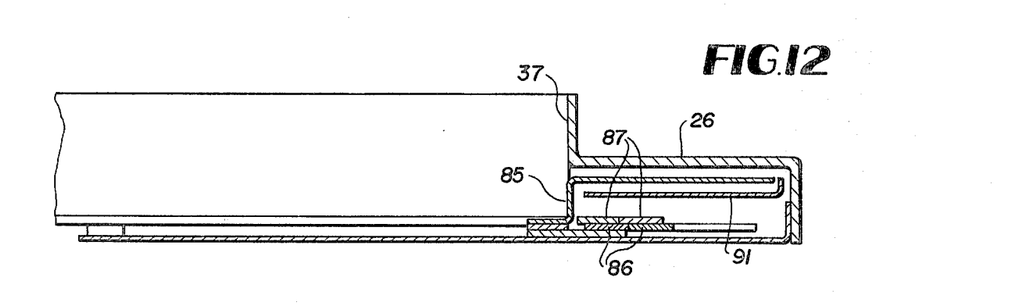
FIG. 12 is a similar view taken on line 12—12 of FIG. 10.
Figure 13:
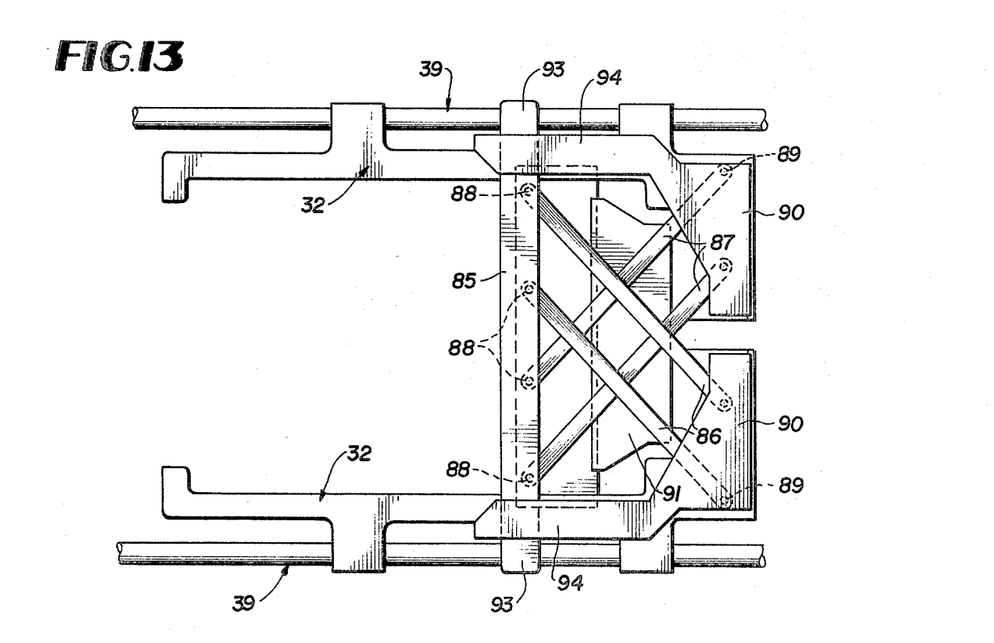
FIG. 13 is a bottom plan view of the elements as shown in FIG. 9.

As previously noted, the front and back loading spot filmer also has the ability to adjust automatically under influence of the stepper motors 71 for two standard cassette sizes, namely 9½ inches square and 14 inches square. To facilitate this in a simple, compact and reliable mechanism, the details of which are shown in FIGS. 9 through 13, a cassette back edge locator bar 85 is connected with twin parallel paired drive links 86 and 87 which cross each other. The forward ends of the paired links are connected at 88 to the transverse locator bar 85 and their rear ends are similarly connected at 89 to the two cassette holding frames 32. The two frames have back extensions 90 thereon for this purpose. A cover guard 91 for the parallel links 86 and 87 is also provided and is connected at 92 to a pair of the parallel links so that the cover guard will travel forwardly and rearwardly between the two positions shown in FIGS. 9 and 10 as the cassette back edge locator bar 85 is advanced and retracted. The locator bar 85 is further supported through side extensions 93 which slide on support plate portions 94 at opposite sides of the cassette holding frames 32. FIG. 9 shows the frames 32 laterally adjusted to accept and support the 9½ inch square cassette 29, and through the operation of the parallel links 86 and 87, when the frames 32 are adjusted toward each other, the back edge locator bar 85 is automatically advanced to the proper position to complete the formation of a square pocket for the smaller cassette 29. Likewise, in FIG. 10, when the frames 32 are separated laterally to accept the larger 14 inch square cassette, the back edge locator bar 85 is automatically retracted by the parallel links to complete the formation of the necessary larger square pocket. The system is precise and reliable.

The spot filmer utilizes a pair of superposed square masks 95 having crossing rectangular apertures 96 and means to advance and retract the masks to provide the desired film exposure aperture shape and location at the radiography station in the manner described in U.S. Pat. No. 3,862,426. The aperture movement means, not shown, is independent of the stepper motor drive for the cassette and its support frames 32. It should be noted that FIG. 2 of the drawings shows the cassette holding frames 32 and masks 95 in their fully retracted or "parked" positions in the spot filmer. The filming or radiography station is disposed forwardly adjacent to the axis of the image intensifier 30, FIG. 1, and the underlying X-ray generator indicated at 97 in phantom lines in FIG. 2.

As previously stated, computerized control means for the precision stepper motor drive system of the spot filmer, such as a microprocessor control, is preferably utilized. The push buttons 31a through 31i are a part of the control system for the spot filmer.

The control push buttons 31a through 31i include, from left to right in FIG. 1, a "park" button, seven successive push buttons depicting selectable filming patterns which are available to the operator for the two different sizes of film cassettes, and a "load" push button. Buttons 31b through 31f show the filming patterns available when the 9½ inch square cassette is being used and push buttons 31g and 31h show the filming patterns available with the larger 14 inch square film cassette. It should be observed at this point that the "park" position for both cassette sizes is at the back of the housing 26 in a laterally centered position. The larger size cassette 95 when being held by the frames 32 does not have the ability to shift laterally in the housing but only longitudinally between the "park" and radiography positions. Only the smaller size cassette can shift with the frames 32 both laterally and longitudinally for the purpose of selectively producing on the smaller size film the various exposure patterns shown on push buttons 31b through 31f. This will be further explained in connection with diagrammatic drawing FIGS. 18A through 18D. It should also be explained that the film masks 95 do not shift laterally but only in the longitudinal direction between the "park" station and the radiography station of the spot filmer. The only lateral movements of the frames 32 while handling the larger size cassette 95 are slight movements apart and together laterally caused by a few steps of operation of the stepper motors 71 to effect the described clamping action on the cassette during transport and filming and the looser holding action during loading and unloading.

In the operation of the spot filmer with suitable microprocessor controls, cassettes 29 or 95 can be loaded or unloaded at the will of the operator through either the front slot 28 or back opening 27. When any operational sequence is dictated by the use of the control push buttons, the frames 32 and the cassette being handled of either size will always return to the "park" position following each advancement to the radiography station through the paths indicated in FIGS. 18A through 18D. The movement sequence of the cassette to and from "park" to the radiography position is completely automatic following depression of a given push button 31b through 31h.

Immediately following depression of a selected push button to initiate an exposure or filming sequence, the two stepper motors 71 are automatically driven a few steps to shift the frames 32 toward each other enough to firmly clamp the sides of a film cassette during transport and during exposure at the radiography station. Similarly, when the cassette reaches either loading or unloading station, the two stepper motors 71 are automatically driven a few steps in the opposite direction to release the clamping force on the cassette at loading or unloading. At all times, however, the frames 32 through their bottom ledges will adequately support the cassette.

To change from one cassette size to the other, the two guide rods 39 and the frames 32 are driven by the stepper motors 71 outwardly laterally or inwardly, as the case may be. A service adjustment is also provided in the spot filmer by means of multiple position switches, not shown, to add or subtract a number of steps from the motor positions to enable the mechanism to handle either U.S. or metric cassette sizes and to adjust the transverse and longitudinal center line positions. In all movements of the frames 32 longitudinally or transversely, the cassette back edge locator bar 85 travels with the frames as it is bodily mounted thereon through the extensions 90. As described previously, outward lateral movement or inward movement of the frames 32 by stepper motors 71 to adjust for the large or small size cassette effects automatic retraction or advancement of the locator bar 85.

Movement of the frames 32 to and from the radiography and "park" positions is caused solely by the operation of the single stepper motor 72 and its associated gearing coupled with the chain driving shaft 58.

When the chains 55 are thus driven in synchronism by stepper motor 72, the two frames 32 will be advanced or retracted in unison because of the connections of the two chains with the carriage plates 64 which in turn, through their blocks 68, are connected with the transverse drive bar 53 for the two cassette holding frames.

Whenever the two synchronized stepper motors 71 drive the longitudinal guide rods 39 laterally, the non-rotational tubes 40 of these guide rods propel the frames 32 laterally in one direction or the other and in such movements, the frames are precisely and positively guided by the transverse bar 53. Simultaneously, the shafts 41 will rotate in synchronism in the proper direction due to the free rolling action of the gears 42 on the stationary transverse rack bars 43. Thus, the unique longitudinal guide rods 39 for the cassette holding frames also serve through their inner rotary shafts 41 to synchronize the lateral movements of the frames 32 in one direction or in opposite directions under influence of the stepper motors 71 and associated elements.

Figure 18A:
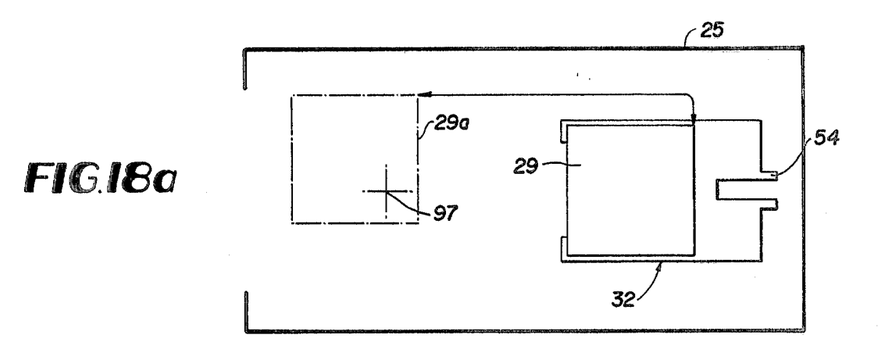
FIGS. 18A through 18D are diagrammatic plan views of the spot filmer showing movement paths of a film cassette in the process of sequentially exposing quadrant areas of film.

Diagrammatic drawing FIGS. 18A through 18D show graphically the movement paths for the smaller size cassette to and from the "park" and radiography stations of the spot filmer, as in response to depressing the control push button 31c which dictates exposing the four quadrant areas of the film in succession. More particularly, FIG. 18A shows the cassette designated 29a shifting laterally from the rear central "park" position and then advancing to an extreme forward position where the axis of the X-ray generator 97 is aligned through the mask aperture with one rear quadrant of the cassette film.

Following exposure of such quadrant, the cassette returns automatically to the "park" position and then shifts laterally in the opposite direction, FIG. 18B, and advances again to the forwardmost position where the second rear film quadrant is exposed, following which the cassette returns to the "park" position.

Figure 18B:
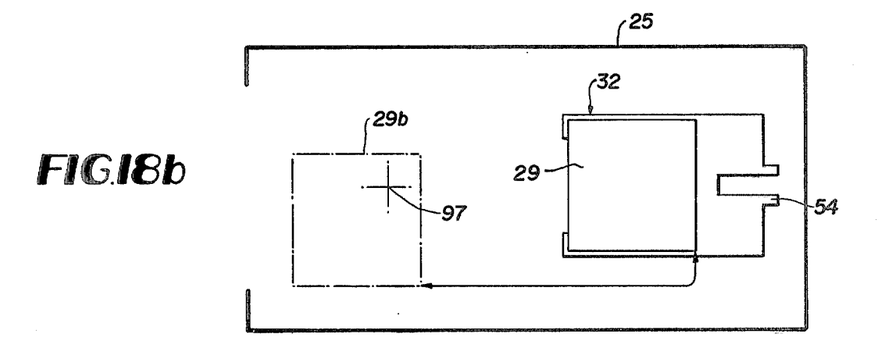
Figure 18C:
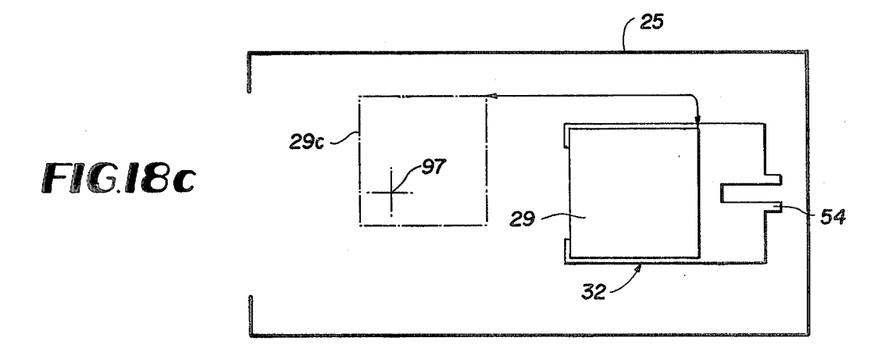

Next, in FIG. 18C, the cassette shifts laterally in the same direction shown in FIG. 18A and moves forwardly automatically a lesser extent to expose one forward quadrant of the film, and then returns automatically on the same path to "park".

Figure 18D:
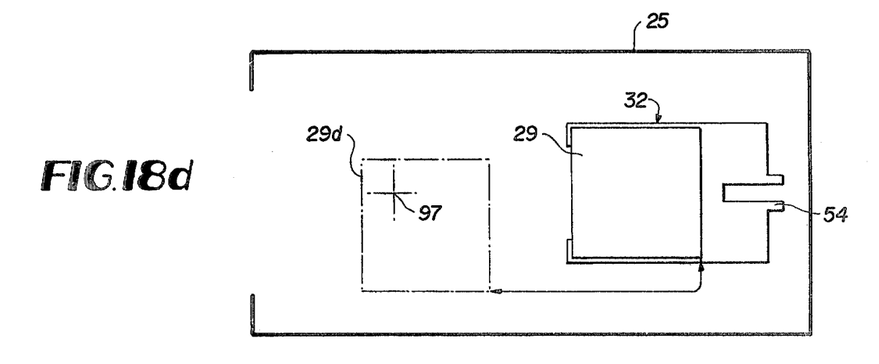

Finally, FIG. 18D, the cassette shifts laterally in the direction illustrated in FIG. 18B and advances forwardly the same distance shown in FIG. 18C, less than the full possible extent of forward travel, and the fourth quadrant area of the film in the cassette is aligned over the X-ray axis 97 for exposure, following which the cassette once again returns to "park" to complete the filming sequence for that cassette.

In any of the operational sequences initiated by the push buttons on the front panel 31, the dual axis drive and guidance system responds with the proper sequence of movements under the microprocessor or other computer controls of which the push buttons are a part.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A spot filmer for a diagnostic X-ray machine comprising a pair of laterally opposed film cassette holding frames, means to drive said frames forwardly and rearwardly in unison and to guide said frames along a first orthogonal path of movement, means to drive said frames selectively in one direction or in opposite directions and to guide said frames along a second orthogonal path of movement, and access means near the opposite limits of movement of said frames along said first orthogonal path to facilitate front or back loading of film cassettes in two sizes into said frames.

2. A spot filmer for a diagnostic X-ray machine as defined in claim 1, and a housing for the spot filmer containing said access means near the front and back thereof.

3. A spot filmer for a diagnostic X-ray machine as defined in claim 1, and said means to drive said frames forwardly and rearwardly in unison along a first orthogonal path of movement including a single drive motor means and gearing coupled between the single drive motor means and said frames.

4. A spot filmer for a diagnostic X-ray machine as defined in claim 1, and said means to drive said frames along said second orthogonal path of movement including a pair of driving motors and gearing coupled between said pair of drive motors and said frames.

5. A spot filmer for a diagnostic X-ray machine as defined in claim 3, wherein said single drive motor means is a stepper motor, and said gearing includes a drive bar for said frames along said first orthogonal path and extending parallel to the second orthogonal path and serving as a guide for said frames during their movements along said second orthogonal path.

6. A spot filmer for a diagnostic X-ray machine as defined in claim 4, wherein said driving motors are stepper motors and said gearing includes a pair of parallel guide members for said frames during their movements along said first orthogonal path and being bodily shiftable with said frames in one direction or opposite directions along said second orthogonal path.

7. A spot filmer for a diagnostic X-ray machine as defined in claim 6, and said parallel guide members each including a rotating interior shaft and a surrounding non-rotatable tube for the guidance of said frames along the first orthogonal path.

8. A spot filmer for a diagnostic X-ray machine as defined in claim 7, and supporting and guiding bearings for said frames including rollers engaging said tubes, said bearings being attached to said frames.

9. A spot filmer for a diagnostic X-ray machine as defined in claim 7, and said gearing further including pairs of gears secured to the opposite ends of said rotating interior shafts, and relatively stationary rack bars with which the gears are rollingly engaged and being parallel and extending along said second orthogonal path.

10. A spot filmer for a diagnostic X-ray machine as defined in claim 9, and said gearing further including a pair of separated rack bars parallel to the stationary rack bars and coupled with said tubes of the parallel guide members, and pinion gears driven by said driving motors and engaged with said pair of separated rack bars.

11. A spot filmer for a diagnostic X-ray machine as defined in claim 1, and control means for said first and second named means including manually operated control function initiating elements.

12. A spot filmer for a diagnostic X-ray machine as defined in claim 1, and an automatic locator member for one edge of a cassette held by said frames and extending along said second orthogonal path and being movably connected with said frames and extending and retracting along said first orthogonal path in response to movements of the frames in opposite directions along said second orthogonal path.

13. A spot filmer for a diagnostic X-ray machine as defined in claim 12, and parallel links interconnecting said frames with opposite end portions of said locator member, said locator member comprising a back edge locator bar for said two sizes of film cassettes.

14. A spot filmer for a diagnostic X-ray machine as defined in claim 1, and each cassette holding frame including an outer side wall, a back wall portion at right angles to the side wall and extending inwardly thereof, a narrow bottom longitudinal support ledge including opposite end inwardly projecting lateral extensions, and a shallow upstanding lip on the lateral extension away from the back wall portion.

15. A spot filmer for a diagnostic X-ray machine as defined in claim 14, and a locator member for one edge of a cassette held by said frames and extending parallel to said second orthogonal path and being movably linked with said frames for automatic extension and retraction along the first orthogonal path responsive to movements of said frames away from and toward each other on said second orthogonal path, whereby said locator member and said frames are able to form two different sizes of square receptor pockets for said two sizes of film cassettes.

16. A spot filmer for a diagnostic X-ray machine comprising a pair of coacting film cassette holders, means to drive said holders forwardly and rearwardly in unison and to guide said holders on a first orthogonal path of movement, means to drive said holders selectively in the same direction or in opposite directions and to guide said holders on a second orthogonal path of movement, and automatically operable cassette back edge locator means linked to said holders and responding to lateral movements thereof in opposite directions to position the back edge locator means properly in relation to the holders for the accommodation of two sizes of square film cassettes.

17. A spot filmer for a diagnostic X-ray machine as defined in claim 16, and housing means for the spot filmer including front and back loading and unloading access means near opposite ends of said first orthogonal path of movement.

18. A spot filmer for a diagnostic X-ray machine comprising a pair of coacting film cassette holders, means to drive and guide said holders along a longitudinal path of movement, means to drive and guide said holders selectively in the same direction or opposite directions along a transverse path of movement, cassette back edge locator means connected to said holders and extending and retracting on said longitudinal path of movement automatically in response to movements of the holders on said transverse path of movement.

19. A spot filmer for a diagnostic X-ray machine as defined in claim 16, and said means to drive said holders and to guide said holders on a second orthogonal path of movement including drive means to first cause said holders to move together on said second orthogonal path for firmly gripping a film cassette at the side edges thereof while the cassette is being transported on said first and second orthogonal paths of movement toward a radiography station and at such station and to subsequently cause separation of said holders on said second orthogonal path so that said holders will loosely support the cassette at a cassette loading and unloading station.

20. A spot filmer for a diagnostic X-ray machine as defined in claim 18, and said means to drive and guide said holders along a transverse path of movement including drive means to initially cause the holders to move together transversely to firmly grip the cassette while it is being transported and while it is at a radiography position and to later cause transverse separation of the holders so that the holders will loosely support the cassette.

* * * * *